Nov. 8, 1938.  J. B. DOVE  2,136,126
COTTON PICKER
Filed Oct. 8, 1937  3 Sheets-Sheet 1

Inventor
J. B. Dove

By Clarence A. O'Brien
Hyman Berman
Attorneys

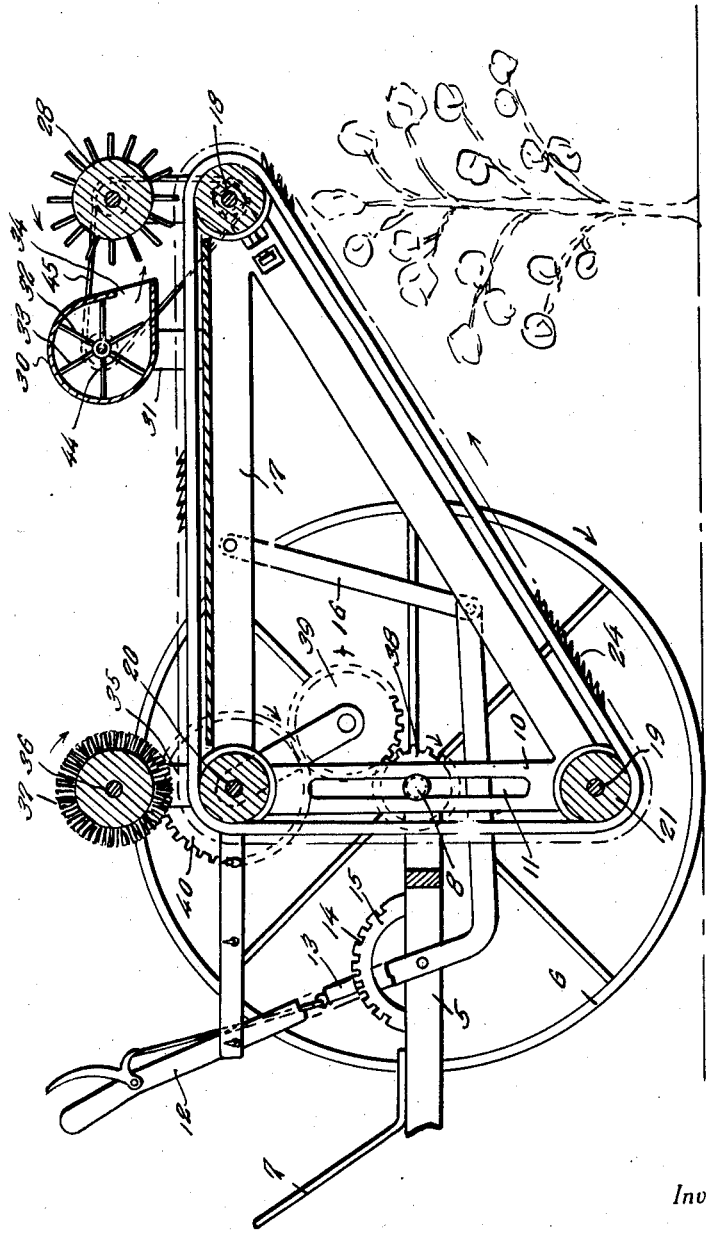

Nov. 8, 1938.   J. B. DOVE   2,136,126
COTTON PICKER
Filed Oct. 8, 1937   3 Sheets-Sheet 3
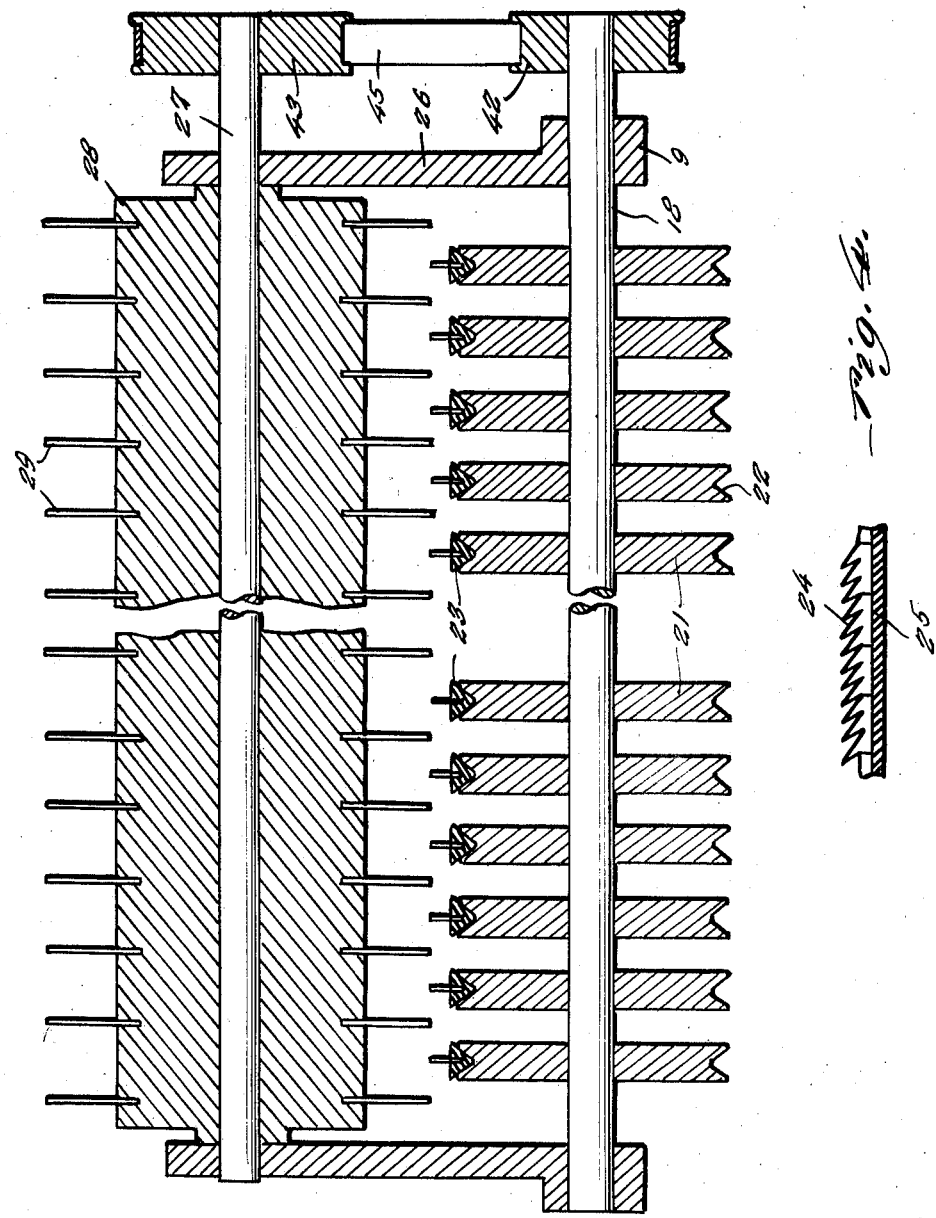

Patented Nov. 8, 1938

2,136,126

UNITED STATES PATENT OFFICE 2,136,126

COTTON PICKER

John B. Dove, Union, Miss.

Application October 8, 1937, Serial No. 168,098

2 Claims. (Cl. 56—49)

The present invention relates to cotton pickers and has for its principal object to provide a wheeled vehicle adapted to be moved over the field of cotton and embodying a plurality of endless, cotton picking band saws adapted to contact and remove the cotton from the plant, together with a blower for removing trash from the saws and a brush for removing the cotton from the saws and discharging the same into a suitable container carried by the vehicle.

A further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation and as more fully and hereinafter described and claimed, reference being had to the accompanying drawings forming part hereof, wherein like numerals refer to like parts throughout and in which:

Figure 2 is a longitudinal sectional view.

Figure 3 is a sectional view through a group of the pulleys for the endless saws with the trash removing drum shown in association therewith and Figure 4 is a fragmentary longitudinal sectional view through one of the endless saws.

Figure 1:
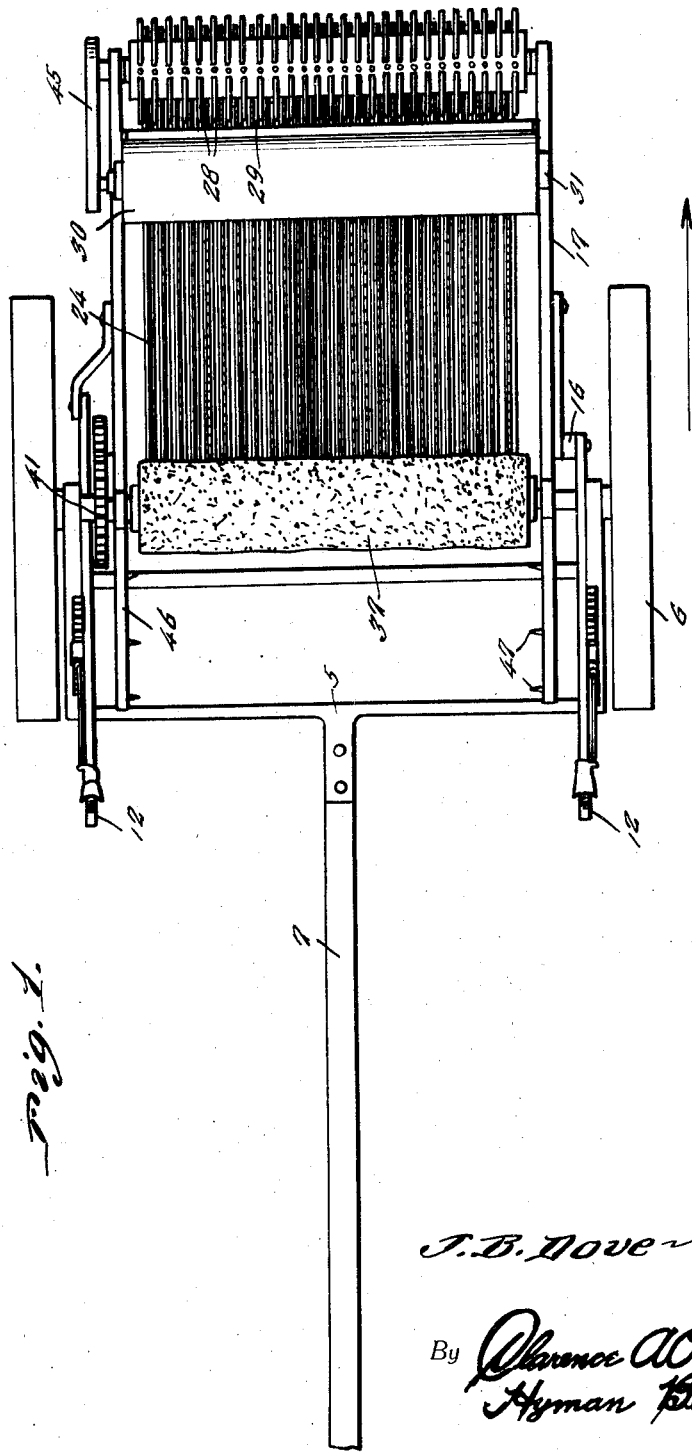
Figure 1 is a top plan view.

Referring now to the drawings in detail, wherein for the purpose of illustration I have disclosed a preferred embodiment of invention the numeral 5 designates a frame mounted on wheels 6, the rear portion of the frame having a tongue 7 by means of which the vehicle may be pushed over the cotton field. Each of the wheels 6 are provided with stub axles 8 upon which a pair of substantially triangular shaped cotton picking frames 9 are mounted, each of said frames embodying a vertically extending rear member 10 having a slotted opening 11 for receiving the stub axle for vertical and pivotal adjustment of the forward end of the frame. The frames 9 are secured in adjusted position by means of a lever 12 having a locking dog 13 cooperating with the notches 14 of an arcuate quadrant 15 secured to the frame 5, the lower end of the lever 12 being pivotally attached to one end of a link 16 having its opposite end pivotally connected to the upper frame member 17 of the frame 9 as will be apparent from Fig. 2 of the drawings.

At each of the corners of the pair of triangular shaped frame members 9 are journalled transversely extending shafts 18, 19 and 20 upon which a plurality of pulleys 21 are freely mounted, each of said pulleys being provided with a substantially V-shaped groove 21 in the periphery thereof. Trained over said pulleys are V-shaped rubber belts 23 having one edge of a saw blade 24 embedded therein, said saw blade being preferably formed of sections 25 as more clearly shown in Fig. 4 of the drawings and cooperating to form an endless blade travelling over said pulleys. The teeth of the saw blade at the lower flight of the belts 23 are inclined forwardly as will be apparent from an inspection of Fig. 2 of the drawings.

Mounted on the forward end of the pair of frames 9 is a pair of upstanding brackets 26 having a transversely extending shaft 27 journalled in the upper ends thereof and upon which is mounted a drum 28 having radially extending teeth 29 adapted to extend between the saws 24 as more clearly shown in Fig. 3 of the drawings and adapted to remove trash from the saws as the latter pass beneath the teeth of the drum.

Rearwardly of the drum 28 is a fan housing 30 supported on upstanding brackets 31 carried by the frame members 9. Journalled in the ends of the band housing is a shaft 32 upon which fan blades 33 are mounted, the lower forward portion of the housing having a discharge opening 34 for directing air from the blowers against the lower portion of the drum 28.

At the rear end of the pair of frames 9 are a pair of upstanding brackets 35 for rotatably supporting a transversely extending shaft 36 having a brush 37 mounted thereon.

The axle 8 of one of the wheels 6 is provided with a gear 38 with which an idler gear 39 is operatively engaged for driving a gear 40 keyed to the shaft 20 for driving the pulleys 21. A gear 41 is also mounted on the shaft 36 engaging the gear 40 for driving the brush 37.

One end of the shaft 18 is provided with a drive pulley 42 and a shaft 27 and 32 are likewise provided with pulleys 43 and 44 respectively and over said pulleys 42, 43 and 44 is trained a belt 45 for driving the tooth drum 28 and fan 33.

Each of the frame members 9 are provided with extensions 46 at their rear end having prongs 47 formed thereon for attaching a sack (not shown) for receiving the cotton as the same is removed from the saws by the brush 37.

In the operation of the device as the vehicle is moved over the ground the saws 24 will contact the cotton bolls and pick the same from the plant, after which the cotton is carried by the endless saws toward the rear of the machine where the cotton is removed by the brush 37 and deposited into the sack.

It is believed the details of construction and operation of the device will be readily understood from the foregoing without further detail explanation.

What is claimed is:

1. A cotton picker of the class described comprising a horizontally arranged U-shaped frame having its limbs extending forwardly, a handle connected to the rear of the frame, stub axles carried by the forward ends of said limbs, a wheel rotatably arranged on each axle, a pair of substantially triangular-shaped frames, each including a vertical rear member, a forwardly extending horizontal member connected with the upper end of the rear member and an upwardly and forwardly sloping third member having one end connected with the lower end of the vertical member and its other end with the forward end of the horizontal member, means for supporting the triangular frames from the limbs of the first-mentioned frame, a transverse shaft having its ends journaled in each pair of corners of the triangular frames, a plurality of pulleys on each shaft, a belt passing over each set of three pulleys on the three shafts, projections carried by the belt and means for rotating one of the shafts, brackets extending upwardly from the front ends of the horizontal members of the triangular frames, a drum rotatably supported by said brackets, projections carried by the drum and arranged over the spaces between the pulleys on the shafts at the front end of the triangular frames, a second pair of brackets carried by the horizontal members of the triangular frames and arranged in rear of the drum carrying brackets, a blower carried by the second pair of brackets and discharging toward the drum, a third pair of brackets extending upwardly from the rear end of the horizontal members of the triangular frames, and a rotary brush carried by the third pair of brackets and means for rotating the drum and brush and operating the blower.

2. A cotton picker of the class described comprising a horizontally arranged U-shaped frame having its limbs extending forwardly, a handle connected to the rear of the frame, stub axles carried by the forward ends of said limbs, a wheel rotatably arranged on each axle, a pair of substantially triangular-shaped frames, each including a vertical rear member, a forwardly extending horizontal member connected with the upper end of the rear member and an upwardly and forwardly sloping third member having one end connected with the lower end of the horizontal member and its other end with the forward end of the horizontal member, means for supporting the triangular frames from the limbs of the first-mentioned frame, a transverse shaft having its ends journalled in each pair of corners of the triangular frames, a plurality of pulleys on each shaft, a belt passing over each set of three pulleys on the three shafts, projections carried by the belt and means for rotating one of the shafts, such means for supporting the triangular frames including longitudinally extending slots in the vertical members of the triangular-shaped frames through which the inner ends of the stub axles extend, a lever pivoted to each limb of the first-mentioned frame and having its lower end extending forwardly and a link connecting the front end of said forwardly extending part with an intermediate portion of the horizontal member of each triangular frame.

JOHN B. DOVE.